United States Patent
Steimer

(10) Patent No.: US 9,882,514 B2
(45) Date of Patent: Jan. 30, 2018

(54) ELECTRICAL CONVERTER WITH HIGH MACHINE SIDE COMMON MODE VOLTAGE

(71) Applicant: ABB Schweiz AG, Baden (CH)

(72) Inventor: Peter Steimer, Ehrendingen (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/368,773

(22) Filed: Dec. 5, 2016

(65) Prior Publication Data
US 2017/0085195 A1    Mar. 23, 2017

Related U.S. Application Data

(63) Continuation of application No. PCT/EP2015/062283, filed on Jun. 2, 2015.

(30) Foreign Application Priority Data

Jun. 4, 2014 (EP) .................................. 14171162

(51) Int. Cl.
| | | |
|---|---|---|
| H02P 6/14 | (2016.01) | |
| H02M 5/458 | (2006.01) | |
| H02M 7/44 | (2006.01) | |
| H02M 7/483 | (2007.01) | |

(52) U.S. Cl.
CPC ............ *H02P 6/14* (2013.01); *H02M 5/4585* (2013.01); *H02M 7/44* (2013.01); *H02M 2007/4835* (2013.01)

(58) Field of Classification Search
CPC .... H02M 5/4585; H02M 5/271; H02M 7/483; H02P 27/06
USPC ....... 318/400.26, 722, 606, 400.3, 801, 807, 318/812, 503, 504
See application file for complete search history.

(56) References Cited

U.S. PATENT DOCUMENTS

| | | | | |
|---|---|---|---|---|
| 4,894,763 A | * | 1/1990 | Ngo ......................... | H02J 3/36 |
| | | | | 318/803 |
| 7,190,143 B2 | * | 3/2007 | Wei ....................... | H02M 7/219 |
| | | | | 318/606 |

(Continued)

OTHER PUBLICATIONS

European Patent Office, International Search Report & Written Opinion issued in corresponding Application No. PCT/EP2015/062283, dated Aug. 18, 2015, 11 pp.
European Patent Office, Extended Search Report issued in corresponding Application No. 14171162.2, dated Nov. 21, 2014, 5 pp.
Garcia et al., "Reduction of Bearing Currents in Doubly Fed Induction Generators," IEEE Industry Application Conference Forty-First IAS Annual Meeting, Piscataway, New Jersey, 2006, pp. 84-89.

(Continued)

*Primary Examiner* — Bentsu Ro
*Assistant Examiner* — Thai Dinh
(74) *Attorney, Agent, or Firm* — Taft Stettinius & Hollister LLP

(57) ABSTRACT

A converter comprises a first inverter for converting a first multi-phase AC voltage into a DC voltage and a second inverter for converting the DC voltage into a second multi-phase AC voltage. A method for controlling the electrical converter comprises: switching the first inverter such that a first common mode voltage is generated in the first multi-phase AC voltage; switching the second inverter such that a second common mode voltage is generated in the second multi-phase AC voltage, wherein the first common mode voltage and the second common mode voltage are synchronized such that the first common mode voltage and the second common mode voltage cancel each other at least partially.

20 Claims, 3 Drawing Sheets

(56) References Cited

U.S. PATENT DOCUMENTS

| | | | |
|---|---|---|---|
| 8,830,704 B2* | 9/2014 | Satou | H02M 7/538 |
| | | | 363/125 |
| 2007/0211501 A1 | 9/2007 | Zargari et al. | |
| 2007/0268052 A1 | 11/2007 | Yin et al. | |
| 2011/0299308 A1 | 12/2011 | Cheng et al. | |
| 2012/0075892 A1* | 3/2012 | Tallam | H02M 1/12 |
| | | | 363/37 |
| 2014/0070755 A1* | 3/2014 | Baek | H02P 27/08 |
| | | | 318/798 |

OTHER PUBLICATIONS

Klumpner et al., "A New Buck-Type Active Front End Rectifier Topology with Improved Voltage Transfer Ratio and Common Mode Voltage Cancellation," Conference Record of the 2005 IEEE Industry Applications Conference Fortieth IAS Annual Meeting, Oct. 2-6 2005, Kowloon, Hong Kong, China, vol. 1, pp. 631-638.

Lee et al., "A Common Mode Voltage Reduction in Boost Rectifier/Inverter System by Shifting Active Voltage Vector in a Control Period," IEEE Transactions on Power Electronics, vol. 15, No. 6, Nov. 2000, pp. 1094-1101.

Lee et al., "Common-Mode Voltage Reduction Method Modifying the Distribution of Zero-Voltage Vector in PWM Converter/Inverter System," IEEE Transactions on Industry Applications, vol. 37, No. 6, Nov./Dec. 2001, pp. 1732-1738.

* cited by examiner

ELECTRICAL CONVERTER WITH HIGH MACHINE SIDE COMMON MODE VOLTAGE

FIELD OF THE INVENTION

The invention relates to a method for controlling an electrical converter. Furthermore, the invention relates to an electrical converter and to a controller for controlling the electrical converter.

BACKGROUND OF THE INVENTION

In a usual setup, an indirect electrical converter comprises an input rectifier, which from an AC input voltage generates a DC link voltage. The DC link voltage is supplied to an output inverter, which generates an AC output voltage, which may be used for driving an electrical machine. Contrary to this motoring mode, it is also possible to use the electrical machine as generator and to convert the AC voltage with variable frequency into an AC voltage with constant frequency to be supplied to an electrical grid.

To allow a better voltage utilization of a multi-phase converter (input rectifier and output inverter), when operated with ungrounded neutral point or star-point, typically overmodulation is used. During overmodulation, a common mode voltage may be added to the fundamental phase voltages, with a dominant component at three times the frequency of the fundamental phase frequency.

However, in this case, the common mode voltages added to the phase voltages on the input rectifier and output inverter may stress the insulation of the converter system and the insulation of connected AC components, i.e of the electrical machine and of the transformer. Therefore, the maximal torque generated with a common mode voltage is limited by the insulation capabilities of the converter system and the connected AC components.

DESCRIPTION OF THE INVENTION

It is an objective of the invention to increase the torque output of an electrical machine driven by an electrical inverter.

This objective is achieved by the subject-matter of the independent claims. Further exemplary embodiments are evident from the dependent claims and the following description.

An aspect of the invention relates to a method for controlling an electrical converter. This method, for example, may be performed by an electronic controller of the electrical converter. In particular, the electrical converter may be a high power converter adapted for converting currents of more than 100 A and/or more than 1.000V.

As an example, the converter may be used for interconnecting an electrical grid with an electrical machine that is used for generating electrical power from a turbine of a hydroelectric power station. In a further operation mode, the converter may be used for supplying the electrical machine with electrical power such that the electrical machine pumps water with the aid of the turbine or the pump-turbine set.

According to an embodiment of the invention, the converter comprises a first inverter for converting a first multi-phase AC voltage into a DC voltage and a second inverter for converting the DC voltage into a second multi-phase AC voltage. In other words, the converter may be an indirect AC-to-AC converter.

According to an embodiment of the invention, the method comprises:

Switching the first inverter such that a first common mode voltage is generated in the first multi-phase AC voltage, wherein the first common mode voltage has a frequency, which is a multiple of three times a fundamental frequency of the first multi-phase AC voltage, switching the second inverter such that a second common mode voltage is generated in the second multi-phase AC voltage, wherein the second common mode voltage has the same frequency as the first common mode voltage, wherein the second common mode voltage is reversed with respect to the first common mode voltage.

A controller of the converter may generate reference voltages for the first and second multi-phase AC voltages and may generate switching commands for semiconductor switches of the inverters. For example, pulse width modulation or direct torque control may be used for generating these switching commands from the reference voltages. In particular, the reference voltages may be generated in a controller that both controls the first inverter and the second inverter.

This controller may generate fundamental multi-phase voltages for the first and the second inverter (which may have different frequencies). For example, a phase voltage of a fundamental multi-phase voltage may be sinusoidal.

Furthermore, the controller may generate the first and the second common mode voltage and may add the common mode voltages to each phase voltage of the fundamental multi-phase voltages. Also, the first and/or the second common mode voltage may be sinusoidal. However, it also may be possible that one or both of the common mode voltages may have another shape (for example with a saw tooth profile).

A common mode voltage may be as one third of the sum of the phase voltages of the respective multi-phase voltage. A common mode voltage may be seen as the voltage from an AC side star-point to the DC side converter neutral or ground point.

The first and second common mode voltages are generated in such a way that they are synchronized, i.e. may cancel each other at least partially. The first and second common mode voltages are generated in such a way that they are synchronized, i.e. may mitigate each other. For example, both common mode voltages may have the same frequency, may be sinusoidal and/or may have the same shape, but have different signs (i.e. may be phase shifted by 180°).

The term synchronization is used above and in the flowing with the meaning of being preferably reversely synchronized, i.e. preferably in phase opposition, meaning being preferably in antiphase synchronization. Two periodic waveforms are in antiphase synchronization if they have the same frequency but are out of phase by half of a period. Therefore, two waveform having half-wave symmetry and being in antiphase synchronisation, cancel each other partially. For example, two sinusoidal waveforms with the same frequency, having different amplitudes and being in antiphase synchronization mitigate each other.

The term mitigate is used in the above and in the following in the sense of cancelling partially, meaning reducing, whereas each of this term might be used as a synonym of the others. For example, if the first and second common mode voltage are in phase opposition, added together according Kirchhoff's voltage law, it results a subtraction, i.e. reduction of the common mode voltage. Said differently, in phase opposition the sum of the first common mode voltage and the second common mode voltage is smaller, i.e. reduced compared to the bigger one of the two common mode voltages.

According to an embodiment of the invention, the amplitude of the second common mode voltage is bigger than the amplitude of the first common mode voltage, whereas in this case the first common mode voltage would partially cancel the second common mode voltage, such that the resulting sum of the first common mode voltage and the second common mode voltage at the AC side of the inverter, e.g. the transformer is smaller in amplitude than the amplitude of the second common mode voltage.

The common mode voltage at a certain component is also referred to as common mode voltage stress of this component. Therefore, a first common mode voltage and a second common mode voltage which cancel each other partially, reduce the common mode voltage stress in the system.

According to an embodiment of the invention, the first common mode voltage partially cancels the second common mode voltage such that the AC side common mode voltage stress, i.e. the resulting sum of the first common mode voltage and second common mode voltage at the AC side, does not exceed the AC side component insulation ratings, e.g. the transformer insulation rating.

For example, the second common mode voltage may be used for generating a high torque in an electrical machine connected to the second inverter. With a synchronized first common mode voltage, the second common mode voltages may be selected higher as without the synchronized first common mode voltage, since the common mode voltages cancel each other and the overall insulation requirements of for the components connected on the AC-side of the converter system are not violated or increased. Therefore, with the same insulation requirements, a higher torque may be generated with the electrical machine. An already existing system with given insulation capabilities may produce a higher torque. This may especially be of importance to retrofit installations, where no higher insulation requirements exist for the existing transformers and the electrical machines.

According to an embodiment of the invention, the first common mode voltage has a frequency, which is a multiple of three times the fundamental frequency of the first multi-phase AC voltage. For example, the first multi-phase AC voltage may have a frequency of 50 Hz or 60 Hz, i.e. an usual grid voltage. In this case, the first common mode voltage has its dominant frequency component at 150 or 180 Hz, or a multiple thereof (such as 300 Hz or 360 Hz). In this case, the first common mode voltage reduces the magnitude (i.e. the maximum) of the first multi-phase AC voltage and the magnitude of the fundamental multi-phase AC voltage (without the common mode voltage) may be increased. According to an embodiment of the invention, the second common mode voltage has the same frequency as the first common mode voltage. In such way, the second common mode voltage (synchronized with the first common mode voltage) cancels at least partially with the first common mode voltage.

According to an embodiment of the invention, the second common mode voltage is reversed with respect to the first common mode voltage. In other words, when both common mode voltages are periodic and have the same frequency, they are phase shifted by 180° with respect to each other.

Above and in the following being reversed to is used in the sense of being close to be, or preferably being in phase opposition to.

According to an embodiment of the invention, the second common mode voltage has a frequency more than three times higher than a fundamental frequency of the second multi-phase AC voltage. It has to be understood the fundamental frequency of the second multi-phase AC voltage, which, for example may be the rotating speed of an electrical machine connected to the first inverter, may be much smaller than the grid frequency. In this case, the second common mode voltage may not reduce the magnitude of the second multi-phase AC voltage (for example by reducing the peaks of a sinusoidal fundamental voltage), but may result in a higher torque.

According to an embodiment of the invention, the magnitude of the first common mode voltage is more than 15% (for example 20%) of the magnitude of a fundamental voltage of the first multi-phase AC voltage. Usually, the first common mode voltage is selected in such a way that a magnitude of the first multi-phase AC voltage does not exceed the maximal possible voltage, which usually is the case for a common mode voltage of 15%. However, it can be shown that 15% common mode voltage results in a very minor reduction of the maximal possible voltage, which is acceptable.

According to an embodiment of the invention, the magnitude of the second common mode voltage is more than 30% (for example 35%) of the magnitude of a fundamental voltage of the second multi-phase AC voltage. The star-point of the electrical machine may be pulled to ground by a large winding capacitance and/or a high ohmic protection grounding. Therefore this 30% second common mode voltage may be fully visible in the common DC-Link. With a first common mode voltage of 15% (see above), the resulting common mode voltage at the input of the first inverter is only 15% (=30%-15%). The corresponding stress to a transformer connected to the input of the first inverter is the same as in the usual case of 15% common mode voltage in the first inverter without synchronized second common mode voltage. Thus, the transformer is capable of insulating such resulting common mode voltage. The converter insulation, especially in the DC-Link, may be designed according to the additional second common voltage stress visible inside the converter.

According to an embodiment of the invention, the magnitude of the second common mode voltage is more than 60% (for example 100%) of the magnitude of a fundamental voltage of the second multi-phase AC voltage. In the case, the transformer (and/or the overall converter system) may be insulated better, also higher common mode currents may be generated in the second inverter. For example, with a first common mode voltage of 15% (as explained above), the resulting common mode voltage at the input of the first inverter may be 85% and corresponding insulation may have to be provided by the transformer and the converter.

According to an embodiment of the invention, the first inverter is an active rectifier connected to an electrical grid and/or the second inverter is connected to an electrical machine. The converter system may comprise the electrical converter as described in the above and in the following, which is interconnected between an electrical grid and an electrical machine.

According to an embodiment of the invention, the first common mode voltage and the second common mode voltage are reversed in respect to each other in order to be in synchronization so that first common mode voltage and second common mode voltage mitigate each other.

According to an embodiment of the invention, the synchronization of the first and second common mode voltage is performed during a start-up phase of an electrical machine connected to the second inverter. In particular during a start-up phase of the electrical machine, for example, when the rotational speed of the electrical machine is between 0 and below a nominal speed, the method as described above and below may be used for generating a higher torque in the electrical machine and therefore for shorting the start-up phase.

According to an embodiment of the invention, the synchronization of the first and second common mode voltage is performed, when an electrical machine connected to the second inverter has a speed lesser than 90%, for example less than 60%, of its nominal speed. The method also may be performed during phase, in which the rotational speed of the electrical machine is substantially smaller than a nominal speed. In this phase, the torque generation without common mode voltages may be much smaller than at the nominal speed.

According to an embodiment of the invention the first inverter and/or second inverter include redundant cells, whereas the redundant cells are used to generate additional first common mode voltage and/or second common mode voltage in order to allow higher torque capabilities during the start-up phase of the electrical machine. In such operation no redundancy is available. For example, redundant cells at the first inverter are used during the start-up of the electrical machine to increase the first common mode voltage and therefore allow to increase the motor-side common mode voltage as well, which, in turn, allows more torque.

A further aspect of the invention relates to a controller for an electrical converter adapted for performing the steps of the method as described in the above and in the following. For example, the method may be implemented in the controller in software or in hardware. The controller may comprise a processor and a memory storing software, which, when executed by the processor, performs the software as described above and below. Alternatively or additionally, at least parts of the method may be implemented in an FPGA.

A further aspect of the invention relates to an electrical converter, for example an electrical converter as described above and below.

According to an embodiment of the invention, the converter comprises a first inverter for converting a first multi-phase AC voltage into a DC voltage, a second inverter for converting the DC voltage into a second multi-phase AC voltage and a controller as described above and below.

According to an embodiment of the invention, the first and/or the second inverters are modular multi-level converters. The first inverter and/or the second inverter may be MMC (modular multi-level) converters, i.e. they may comprise a number of converter cells connected in series. Each of these converter cells may comprise a cell capacitor. Each of the inverters (or the converter cells) may comprise power semiconductor switches that may be switched by the controller to generate the first and/or second AC multi-phase voltages. According to an embodiment of the invention, the electrical converter further comprises a transformer electrically connected to the first inverter, which is adapted for transforming a multi-phase AC grid voltage into the first multi-phase AC voltage to be supplied to the first inverter. The transformer is adapted for insulating a common mode voltage resulting from a sum of the first common mode voltage and the second common mode voltage. In the case, the system of converter and electrical machine is earthed at the machine side, for example due to a high-resistive star-point grounding and a large machine capacitance, all of the common mode voltages produced by the converter add up at the star-point of the transformer on the grid side. The transformer then has to be configured to insulate the resulting common mode voltage with respect to the ground.

On the one hand, the control method may be used for enhancing the torque output of an already installed system. In this case, the resulting common mode voltage at the transformer may not be higher as the insulation capabilities of the transformer. On the other hand, for a new system, the transformer may be insulated better to provide the possibility to generate higher common mode voltages and to start up the system with higher torques. It has to be understood that features of the method as described in the above and in the following may be features of the electrical converter and/or its controller as described in the above and in the following and vice versa.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
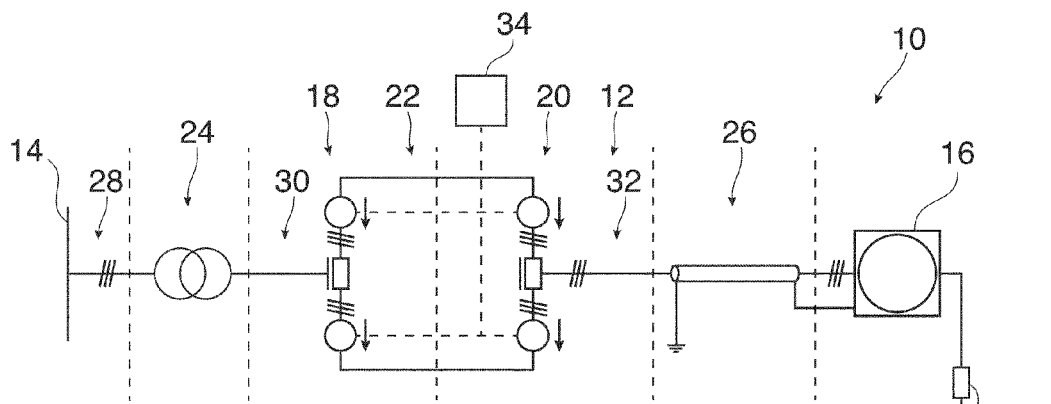
FIG. 1 schematically shows a converter according to an embodiment of the invention.

FIG. 1 shows a converter system 10 comprising an electrical converter 12 interconnected between an electrical grid 14 and an electrical machine 16 (for example a generator that also may be used as motor). The electrical converter 12 comprises a first inverter 18 (an active rectifier) and a second inverter 20 that are connected via a DC link 22. The first inverter 18 is connected via a transformer 24 to the electrical grid 14 and the second inverter 20 is connected via a cable 26 with the electrical machine.

A three-phase voltage 28 from the grid is transformed into a first three-phase AC voltage 30, which is supplied to the first inverter 18. The first inverter 18 generates a DC voltage in the DC link 22, which is converted into a second three-phase AC voltage 32 that is supplied to the electrical machine 16.

Figure 2:
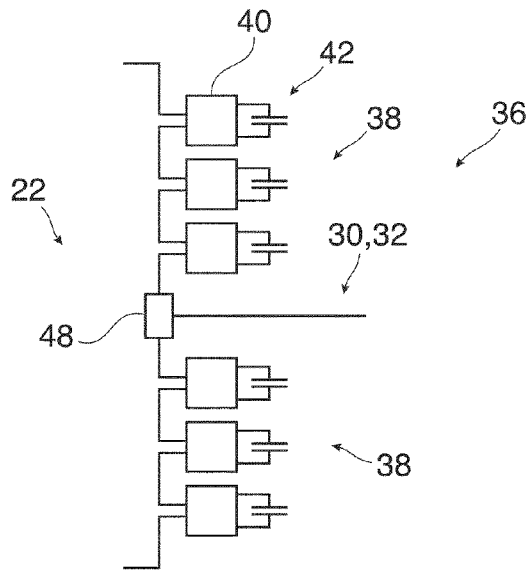
FIG. 2 schematically shows an inverter branch for the converter of FIG. 1.

The converter 12 furthermore comprises a controller 34, which controls the two inverters 18, 20. The controller 34 generates reference voltages for the first and second three-phase AC voltages 30, 32 and generates switching commands for semiconductor switches of the inverters 18, 20, for example by pulse-width modulation or direct torque control. FIG. 2 shows a converter arm 36 of one of the converters 18, 20. The two inverters 18, 20 may be modular multi-level converters, each comprising three such arms 36 for each phase. The arm 36 comprises two branches 38 interconnecting the DC link 22 with a phase output, which provides the respective phase of the multi-phase AC current 30, 32.

Each branch 38 comprises a plurality of converter cells 40, which comprises at least two semiconductor switches for connecting the cell 40 to the branch and for disconnecting the cell from the branch 38. Each cell 40 comprises a cell capacitor 42.

Figure 3:
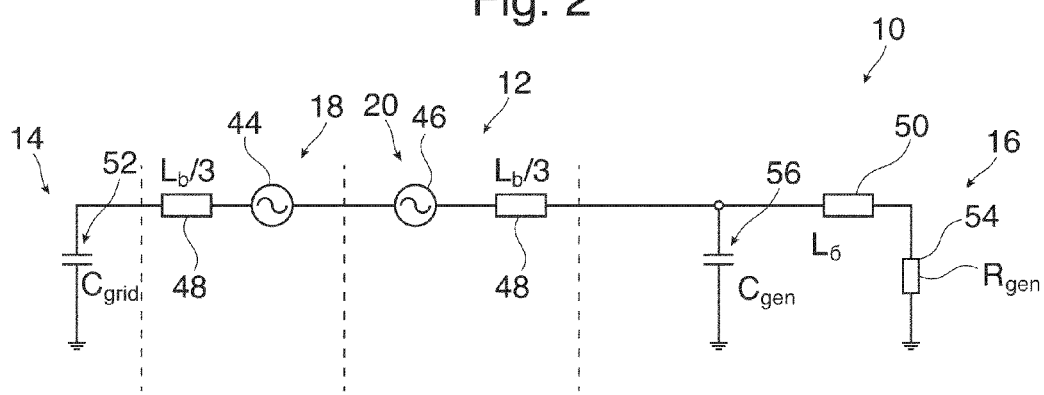
FIG. 3 schematically shows a common-mode equivalent circuit of the system of FIG. 1.

FIG. 3 shows a converter common mode equivalent circuit. The converter 12 and in particular, the controller 34 may create common mode voltages between the inputs and outputs of the inverters 18, 20 and the converter 12. Common mode voltages and common mode currents of the converter system 10 may be described using the common mode equivalent circuit, which includes the first inverter 18 as first common mode equivalent voltage source 44 and the second inverter 20 as second common mode equivalent voltage source 46.

FIG. 3 furthermore shows the arm inductors 48 and an inductor 50 representing the windings of the electrical machine 16. Additionally, a capacitance 52 of the grid 12 with respect to ground are shown. It is assumed, that a high resistive star-point grounding 54 and a large machine winding capacitance 56 are earthing the system 10 in regards of common mode voltage on the machine side.

In the following, three operation modes for the system 10 are described that may in particular be used, when the machine side inverter 20 (and therefore the machine 16) is operated at low speed, for example below 90% of a nominal speed or in a start-up phase.

Normal Mode

The controller 34 may operate the system 10 in a normal mode, in which the inverters 18, 20 are operated in a motoring mode. In the motoring mode, the electrical machine 16 is used as a motor. In this normal mode, the grid side inverter 18 may be operated up to a modulation index of 1.15 (where 0.03 are reserved for control dynamics) with 15% third harmonic common mode voltage at the grid side frequency. The grid side inverter 18 may need an overmodulation of 1.12 to be able to withstand 10% grid overvoltage conditions at N−1 redundancy operation (at one converter cell 40 lost). In normal operation, with using the redundant cell, the modulation index will be reduced to a value of 1.15/N×N−1.

On the other hand in normal mode, the machine side inverter 20 is operated at a modulation index of 1.02 with only 2% third harmonic common mode voltage at the machine side frequency. The machine side inverter 20 may need an overmodulation of 1.02 to be able to withstand 10% machine overvoltage conditions at N−1 redundancy operation (one converter cell 40 lost). In normal mode, with using the redundant cell, the modulation index will be reduced to a value of 1.02 /N×N−1.

Figure 4:
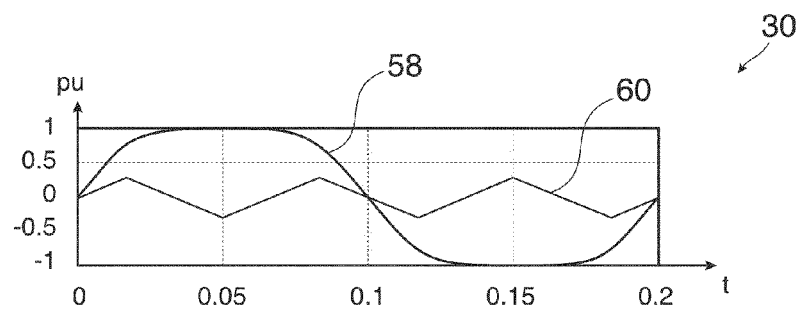
FIG. 4 shows a diagram with a grid side phase voltage generated by the converter of FIG. 1.

Additionally, small higher frequency components due to cell unbalance (at integer multiples of cell carrier frequency) and resulting switching frequency (N+1 times cell carrier frequency) may be present. They may be a concern for the transformer and machine insulation and may need to be mitigated, if needed, by dv/dt- or RC-filters. As an example, in normal operation mode, the grid side fundamental voltage of a phase of the multi-phase AC voltage 30 may have a frequency of 50 Hz and the grid side common mode voltage may have a frequency of 150 Hz or 180 Hz (third harmonic of grid side fundamental voltage). The machine side fundamental voltage of the multi-phase AC voltage 32 may have a much lower frequency as the grid side voltage, say f Hz. The machine side common mode voltage may then have a frequency of 3f Hz (third harmonic of grid side fundamental voltage). It has to be noted that in normal mode, the grid side common mode voltage and the machine side common mode voltage are not synchronized. FIG. 4 shows a phase voltage 58 of the grid side AC voltage 30 with 15% overmodulation and a 15% common mode voltage 60 that may be used in normal mode. FIG. 4 shows the phase voltage 58 in natural units (pu) and over time. It can be seen, that the peak voltage stress (phase to ground) is not exceeding 1 pu. It can be concluded, that the insulation system is not stressed additionally by the fundamental and $3^{rd}$ harmonic voltages. As shown in FIG. 4, the common mode voltage 60 (in the normal mode and also in the modes described in the following) may have a saw tooth profile.

In normal mode (without synchronization of common mode voltages), it is preferable to run only a small or no overmodulation on the machine side and to stay below 15% overmodulation on the grid side.

Retrofit Mode

In the case it is not possible to modify the insulation capabilities of the system 10, such as the insulation of the star-point of the transformer 24 to ground, the controller 34 may operate the system in retrofit mode. The retrofit mode allows a retrofit of existing plants without exchanging the transformer and the generator.

The retrofit mode may be used for generating a maximal torque at low-speed and to keep the common mode voltage stress for the generator 16 and the transformer 24 at very low levels.

Figure 5:
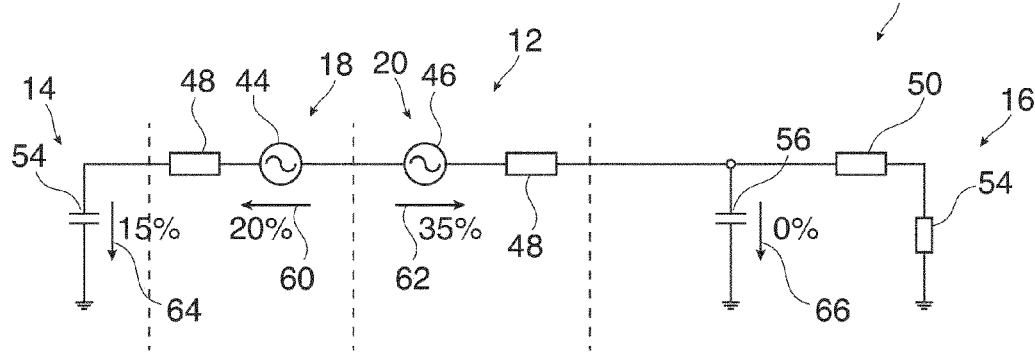
FIG. 5 schematically shows the equivalent circuit of FIG. 3 with common mode voltages in a first operation mode.

FIG. 5 shows a diagram similar to FIG. 3, which indicates the generated common mode voltages 60, 62 in the inverters 18, 20 and the resulting common mode voltage 64 at the transformer 24 and the machine 16.

Figure 6:
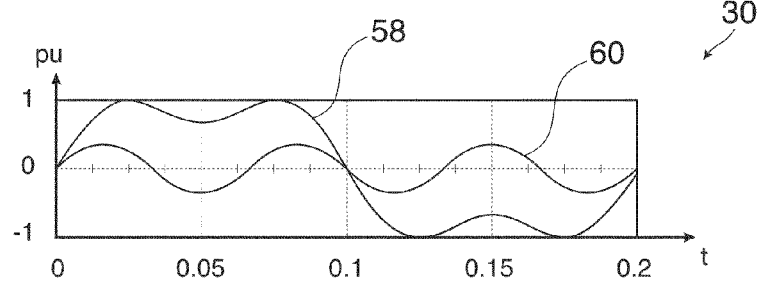
FIG. 6 shows a diagram with a grid side phase voltage generated by the converter of FIG. 1.

As also shown in FIG. 6, in the retrofit mode, the modulation index of the grid side inverter 18 is set to 1.20, i.e. a 20% third harmonic common mode voltage 60 is added to the fundamental phase voltage on the grid side. FIG. 6 shows the resulting phase voltage 60 at the grid side in the retrofit mode. (As shown in FIG. 6, the common mode voltage 60 (in all modes) may have a sine profile.)

Calculations show that a 100% fundamental voltage with 15% third harmonic overmodulation (as in the normal mode) result in maximal 0.998 pu in the phase voltage and that a 100% fundamental voltage with 20% third harmonic overmodulation (as in the retrofit mode) result in maximal 1.002 pu in the phase voltage. Thus, 5% more third harmonic injection of a common mode voltage results in only 0.4% lower fundamental phase voltage.

Furthermore, in the retrofit mode, the second or machine side common mode voltage 62 is selected to be 35% of the corresponding fundamental voltage. The second or grid side inverter 20 is operated with a low modulation index as the fundamental voltage of the electrical machine is proportional to the fundamental frequency. There is enough room to modulate the 35% of common mode voltage.

The second common mode voltage 62 is additionally synchronized with the first common mode voltage 60 and has the opposite sign of the first common mode voltage 60. In particular, the frequency of the second common mode voltage 62 is changed to the frequency of the first common mode voltage 60. This results in a cancellation of the common mode voltages 60, 62. Under the assumption that the machine is grounded (i.e. a common mode voltage 66 of 0 at the machine, 15% common mode voltage 64 (35% machine side—20% grid side=15%) remains at the star-point of the transformer 24.

In the retrofit mode, no additional voltage stress on the transformer 24 from phase to ground or phase to phase is generated. Only the star-point of the transformer 24 sees a stress of 15% common mode voltage 64. This should not be an issue, as this is rather expected to be insulated for 100% of the phase voltage.

New Installation Mode

For new installations, for example systems 10 with improved insulation, the torque may be increased to the physical limits by utilizing higher common mode voltages, for example common mode voltages at their physical limits.

Figure 7:
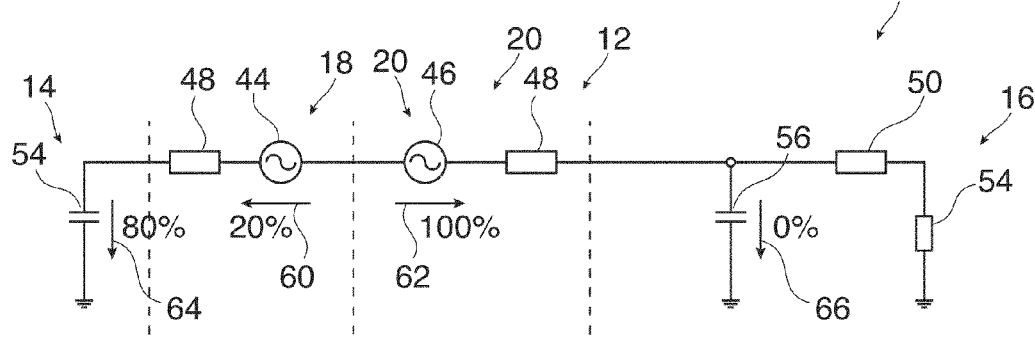
FIG. 7 schematically shows the equivalent circuit of FIG. 3 with common mode voltages in a second operation mode.

FIG. 7 shows a diagram similar to FIG. 3 and FIG. 5, which indicates the generated common mode voltages 60, 62 in the inverters 18, 20 and the resulting common mode voltage 64 at the transformer 24 and the machine 16 in the new installation mode.

Differently to the retrofit mode, the modulation index of the second inverter 20 may be raised to 2.0, resulting in 100% second common mode voltage 62. In summary, this results in 80% common mode voltage 64 at the transformer 24.

This operation mode requires a much higher phase to ground insulation voltage of the transformer 24. For example, the insulation system has to be increased by approximately 55% for the transformer 24 to allow such high torques.

Figure 8:
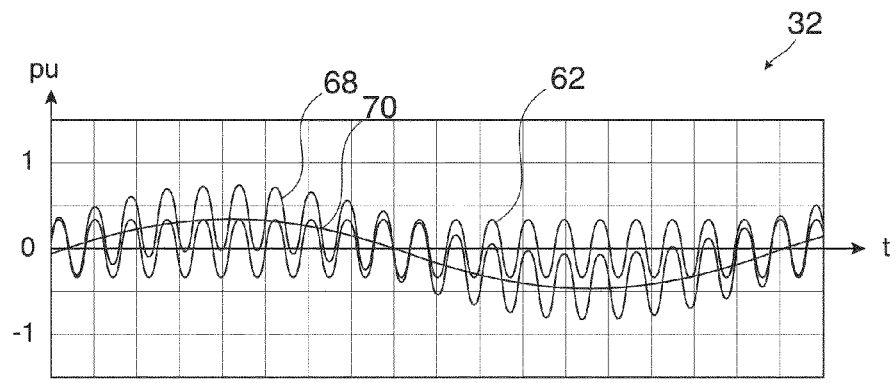
FIG. 8 shows a diagram with a machine side phase voltage generated by the converter of FIG. 1.

FIG. 8 shows a diagram with a phase voltage 68 of the second multi-phase AC voltage 32 generated by the second inverter 20 during retrofit or new installation mode. The phase voltage 68 is the sum of a low frequency fundamental voltage 70 (for example sinusoidal as shown) and the second common mode voltage 62 that may have a frequency higher as three times the frequency of the fundamental voltage, since it is synchronized with the first common mode voltage.

As shown, the second common mode voltage 62 may be sinusoidal, but also may have another shape as the first common mode voltage, for example with a saw tooth profile.

Figure 9:
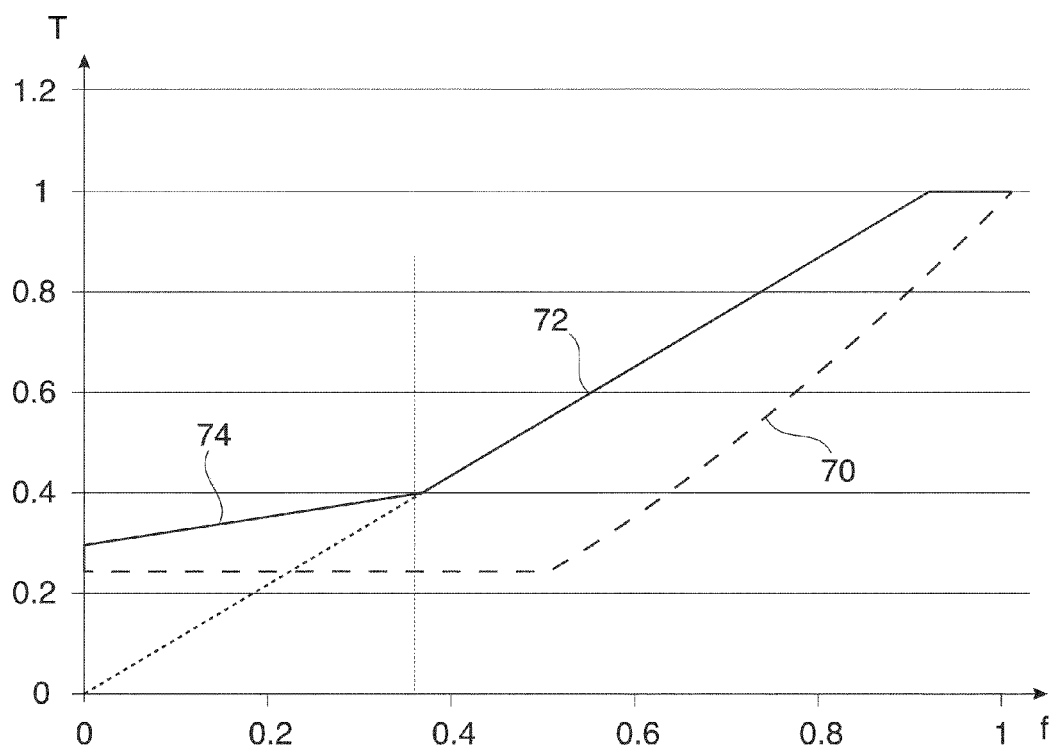
FIG. 9 shows a diagram comparing torques generated by an electrical machine connected to the converter of FIG. 1.

FIG. 9 shows the torque T of the electrical machine 16 versus the output frequency f of the converter 12 in natural units in the case of the indirect MMC converter 12 for retrofit applications (assuming full current at 90% of speed). At nominal voltage, the margin for overvoltage on the grid side may be utilized resulting in a grid side common mode voltage of 35% instead of 20%. The dashed line shows a typical quadratic torque load 70, the continuous line shows the torque 72, 74 generated by the electrical machine 16 supplied by the converter 12. The converter 12 is operated in retrofit mode below the frequency of about 0.35 f.

A similar effect may be achieved, if the system 10 is operated during start-up with full utilization of redundant cells (no redundancy available during start-up). If higher torque capabilities are needed even at overvoltage conditions and without scarifying the redundancy, 10% more power electronics can be installed on the grid side.

These solutions allow to increase the motor-side common mode voltage to 50% (instead of 35%), which allows 43% more torque (instead of 0.3 pu torque we can achieve 0.42 pu torque). While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 converter system
12 electrical converter
14 electrical grid
16 electrical machine
18 first inverter
20 second inverter
22 DC link
24 transformer
26 cable
28 grid side three-phase AC voltage
30 first three-phase AC voltage
32 second three-phase AC voltage
34 controller
36 converter arm
38 converter branch
40 converter cell
42 cell capacitor
44 first common mode voltage source
46 second common mode voltage source
48 arm inductance
50 machine inductance
52 grid capacitance
54 machine earthing resistance
56 machine capacitance
58 first (grid side) phase voltage
60 first (grid side) common mode voltage
62 second (machine side) common mode voltage
64 common mode voltage at transformer
66 common mode voltage at machine
68 second (machine side) phase voltage
70 machine side fundamental voltage
72 torque load
74 machine torque
76 machine torque in retrofit mode

The invention claimed is:

1. A method for controlling an electrical converter the converter comprising a first inverter for converting a first multi-phase AC voltage into a DC voltage and a second inverter for converting the DC voltage into a second multi-phase AC voltage , the method comprising:
   switching the first inverter such that a first common mode voltage is generated in the first multi-phase AC voltage, wherein the first common mode voltage has a frequency, which is a multiple of three times a fundamental frequency of the first multi-phase AC voltage,
   switching the second inverter such that a second common mode voltage is generated in the second multi-phase AC voltage, wherein the second common mode voltage has the same frequency as the first common mode voltage, and wherein the second common mode voltage is reversed with respect to the first common mode voltage.

2. The method of claim 1, wherein the second common mode voltage has a frequency more than three times higher than a fundamental frequency of the second multi-phase AC voltage.

3. The method of claim 2, wherein the magnitude of the first common mode voltage is more than 15% of the magnitude of a fundamental voltage of the first multi-phase AC voltage.

4. The method of claim 2, wherein the magnitude of the second common mode voltage is more than 30% of the magnitude of a fundamental voltage of the second multi-phase AC voltage.

5. The method of claim 1, wherein the magnitude of the first common mode voltage is more than 15% of the magnitude of a fundamental voltage of the first multi-phase AC voltage.

6. The method of claim 1, wherein the magnitude of the second common mode voltage is more than 30% of the magnitude of a fundamental voltage of the second multi-phase AC voltage.

7. The method of claim 1, wherein the magnitude of the second common mode voltage is more than 60% of the magnitude of a fundamental voltage of the second multi-phase AC voltage.

8. The method of claim 1, wherein the first inverter is an active rectifier connected to an electrical grid; and/or wherein the second inverter is connected to an electrical machine.

9. The method of claim 1, wherein the first common mode voltage and the second common mode voltage are reversed in respect to each other in order to be in synchronization so that the first common mode voltage and second common mode voltage mitigate each other.

10. The method of claim 1, wherein the synchronization of the first common mode voltage and the second common mode voltage is performed during a start-up phase of an electrical machine connected to the second inverter.

11. The method of claim 1, wherein the synchronization of the first common mode voltage and the second common mode voltage is performed, when an electrical machine connected to the second inverter has a speed less than 90% of its nominal speed.

12. The method of claim 1,
wherein the first inverter and/or second inverter include redundant cells,
wherein the redundant cells are used to generate additional first common mode voltage and/or second common mode voltage in order to allow higher torque during the start-up phase of the electrical machine.

13. A controller for an electrical converter, the electrical converter comprising a first inverter for converting a first multi-phase AC voltage into a DC voltage and a second inverter for converting the DC voltage into a second multi-phase AC voltage, the controller operable to:
switch the first inverter such that a first common mode voltage is generated in the first multi-phase AC voltage, wherein the first common mode voltage has a frequency, which is a multiple of three times a fundamental frequency of the first multi-phase AC voltage;
switch the second inverter such that a second common mode voltage is generated in the second multi-phase AC voltage, wherein the second common mode voltage has the same frequency as the first common mode voltage, and wherein the second common mode voltage is reversed with respect to the first common mode voltage.

14. An electrical converter, comprising:
a first inverter for converting a first multi-phase AC voltage into a DC voltage;
a second inverter for converting the DC voltage into a second multi-phase AC voltage;
a controller operable to:
switch the first inverter such that a first common mode voltage is generated in the first multi-phase AC voltage, wherein the first common mode voltage has a frequency, which is a multiple of three times a fundamental frequency of the first multi-phase AC voltage;
switch the second inverter such that a second common mode voltage is generated in the second multi-phase AC voltage, wherein the second common mode voltage has the same frequency as the first common mode voltage, and wherein the second common mode voltage is reversed with respect to the first common mode voltage.

15. The electrical converter of claim 14, wherein the first inverter and/or the second inverter are modular multi-level converters with unipolar and/or bipolar cells.

16. The electrical converter of claim 15, wherein the first inverter and/or second inverter include redundant cells.

17. The electrical converter of claim 14, wherein the first inverter and/or second inverter include redundant cells.

18. The electrical converter of claim 17, further comprising:
a transformer electrically connected to the first inverter, which is adapted for transforming a multi-phase AC grid voltage into the first multi-phase AC voltage to be supplied to the first inverter;
wherein the transformer is adapted for insulating an additional common mode voltage stress resulting from a sum of the first common mode voltage and the second common mode voltage.

19. The electrical converter of claim 14, further comprising:
a transformer electrically connected to the first inverter, which is adapted for transforming a multi-phase AC grid voltage into the first multi-phase AC voltage to be supplied to the first inverter;
wherein the transformer is adapted for insulating an additional common mode voltage stress resulting from a sum of the first common mode voltage and the second common mode voltage.

20. The electrical converter of claim 14, wherein the electrical converter is adapted for insulating an additional common mode voltage stress resulting from the second common mode voltage.

* * * * *